United States Patent
Hatch et al.

(10) Patent No.: US 9,130,854 B2
(45) Date of Patent: Sep. 8, 2015

(54) MEASUREMENT METHOD

(75) Inventors: Christopher Byron Hatch, London (GB); Stephen Charles Beaumont, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/119,806

(22) PCT Filed: May 16, 2012

(86) PCT No.: PCT/GB2012/000440
§ 371 (c)(1),
(2), (4) Date: Nov. 22, 2013

(87) PCT Pub. No.: WO2012/156670
PCT Pub. Date: Nov. 22, 2012

(65) Prior Publication Data
US 2014/0198667 A1    Jul. 17, 2014

(30) Foreign Application Priority Data
May 17, 2011    (EP) .................................... 11250531

(51) Int. Cl.
H04L 12/26    (2006.01)
H04M 3/30    (2006.01)

(52) U.S. Cl.
CPC .............. *H04L 43/12* (2013.01); *H04L 43/50* (2013.01); *H04M 3/305* (2013.01)

(58) Field of Classification Search
USPC .............. 370/242, 247, 249, 252, 255; 379/9, 379/22.03, 27.01, 30, 382
See application file for complete search history.

(56) References Cited

U.S. PATENT DOCUMENTS

| | | | |
|---|---|---|---|
| 2004/0086086 A1* | 5/2004 | Butler et al. ...................... | 379/9 |
| 2010/0097070 A1* | 4/2010 | Crick ............................. | 324/525 |
| 2011/0149744 A1* | 6/2011 | Aboughanaima et al. ..... | 370/242 |
| 2013/0070908 A1 | 3/2013 | Beaumont et al. | |
| 2013/0101093 A1* | 4/2013 | Tennyson et al. ............... | 379/28 |

FOREIGN PATENT DOCUMENTS

| | | |
|---|---|---|
| EP | 1 843 564 A1 | 10/2007 |
| EP | 2 112 810 A1 | 10/2009 |
| EP | 2 383 212 A1 | 12/2011 |
| GB | 2 367 971 A | 4/2002 |
| WO | WO 01/76208 | 10/2001 |
| WO | WO 01/76209 | 10/2001 |
| WO | WO 2004/086738 | 10/2004 |

OTHER PUBLICATIONS

BT Suppliers' Information Note, BT Metallic Path Facility Interface Description, SIN 349 Issue 2.4 Nov. 2011 (see also http://www.btwebworld.com/sinet/349v2p3.pdf).

* cited by examiner

*Primary Examiner* — Awet Haile
(74) *Attorney, Agent, or Firm* — Patterson Thuente Pedersen, P.A.

(57) ABSTRACT

The performance of a test apparatus for a communications network may be inferred by analyzing a set of performance data results measured on a number of different lines in the network. Once a sample of sufficient size for a particular test apparatus has been created then it is possible to infer the performance of the test apparatus based on the ratio of passes to fails recorded.

9 Claims, 4 Drawing Sheets

MEASUREMENT METHOD

RELATED APPLICATIONS

The present application is a National Phase entry of PCT Application No. PCT/GB2012/000440 filed May 16, 2012, which application claims the benefit of priority to EP Patent Application No. 11250531.8, filed May 17, 2011, the entire disclosures of which are incorporated herein by reference.

TECHNICAL FIELD

The present invention relates to a method of determining the performance of test equipment, and in particular to a method of determining the performance of network test equipment based on the analysis of a number of network test results.

BACKGROUND

FIG. 1 shows a schematic depiction of a conventional copper access network which carries telephony and digital subscriber line (DSL) signals between an exchange building 210 and a plurality of customer premises 400. Each of the customer premises is connected to the local exchange building by a line 220, an example of which is shown in FIG. 1. The line comprises a pair of metallic conductors, normally made from copper. The line typically comprises an exchange portion 230, which connects the exchange to a primary node 235, and a distribution portion 240, which connects the primary node 235 to a secondary node 245. The secondary node 245 is connected to the customer premises 400 via a drop wire, which is often routed overhead via a telephone pole 255 but may be routed underground, for example in ducting. Further cable joints 265 may be made, for example to connect two lengths of cable together. It may be necessary to measure the electrical properties of a line at a cable joint, a primary node, a secondary node or at the customer premises.

It is common for network operators to be forced by regulators to open up their access networks for use by other communications providers, in a process known as local loop unbundling (LLU). In LLU, other communications providers (CPs) install their transmission equipment in local exchanges such that the CPs can offer telephony and/or broadband services to their customers. The applicant operates an access network to which over 400 CPs have access. The regulatory regime obliges the network operator to provide access to the network and to associated network services on an equivalent basis to both CPs and other divisions of the network operator's company. As a consequence of this, the minimum specification for the access network lines is defined so that CPs are able to plan the provision of their services. The specification for the applicant's access network is known as Supplier Information Note 349, SIN 349 (2009) (see also http://www.btwebworld.com/sinet/349v2p3.pdf).

The network operator needs to be able to measure the electrical parameters of the lines that comprise the access network to ensure that they are within the limits of the parameters defined in the specification. In order to do so, it will be understood that the measurement apparatus used should be calibrated such that CPs and others can be confident that the lines are within the specification.

SUMMARY

According to a first aspect there is provided a method of determining the performance of a test apparatus, the method comprising: a) attaching a test apparatus to a communications network, the communications network comprising a plurality of local exchanges, each of the local exchanges being connected to a plurality of customer premises by a metallic loop; b) applying one or more test signals to a metallic loop; c) determining one or more metallic loop parameters in accordance with measurements made whilst the one or more test signals were applied to the metallic loop; d) comparing the one or more metallic loop parameters to predetermined threshold values; e) determining the status of the metallic loop on the basis of the comparison performed in d); f) storing data relating to the status of the metallic loop in a database; and g) determining the performance of the test apparatus on the basis of the data stored in the database which relates to tests carried out by that test apparatus.

The performance of the test apparatus may be determined to be acceptable if the ratio of acceptable test results to unacceptable test results is greater than a predetermined threshold value. The ratio of acceptable test results to unacceptable test results may be determined based on a pre-determined number of measurements. For example, the performance of the test apparatus may be determined to be acceptable if the ratio of acceptable test results to unacceptable test results is greater than 75% and this ratio has been calculated from at least 20 measurements.

The metallic loop parameters measured may be the insertion loss, the resistance of the metallic loop and the capacitance between the two wires which comprise the metallic loop. The state of the metallic loop may be determined using a Cone of Acceptability (CoA) analysis, in which the state of the metallic loop is determined by: a) determining an estimate for the length of the metallic loop for each of the plurality of metallic loop parameters based on the measured parameter value and a pre-determined further value associated with each of the plurality of parameters; b) determining a weighted average transmission line length based on the plurality of transmission line length estimates; and c) inferring the condition of the transmission line based on the weighted average determined in b) and the plurality of transmission line length estimates determined in a). Furthermore, in c) the ratio of the estimated transmission line length to the weighted average transmission line length may be determined for each of the plurality of transmission line parameters and the condition of the transmission line is inferred in accordance with the plurality of ratios.

The condition of the transmission line can be inferred as being acceptable if each of the plurality of ratios is less than a first predetermined value. Similarly, it can be inferred that the transmission line may have an unacceptable condition in the future if each of the plurality of ratios determined in c) are greater than the first predetermined value but less than a second predetermined value. Furthermore, it can be inferred that the transmission line has an unacceptable condition if each of the plurality of ratios determined in step c) are greater than the second predetermined value. It will be understood that the first predetermined value may be equal to the second predetermined value.

According to a second aspect there is provided a test apparatus comprising a processing unit, memory means and data storage means, the apparatus being configured, in use, to perform a method as described above.

According to a third aspect there is provided a data carrier for use in a computing device, the data carrier comprising computer executable code which, in use, performs a method as described above.

According to a fourth aspect there is provided a communications network comprising: a plurality of local exchanges;

a plurality of communications links, each of the plurality of communications links connecting a local exchange to a local premises; a test database comprising test data for each of the plurality of communications links; wherein, in use, the test database can be analysed to determine the performance of a test apparatus on the basis of the test data associated with that test apparatus.

BRIEF DESCRIPTION OF THE DRAWINGS

Embodiments will now be described, by way of example only, with reference to the accompanying drawings in which.

DETAILED DESCRIPTION

Figure 1:
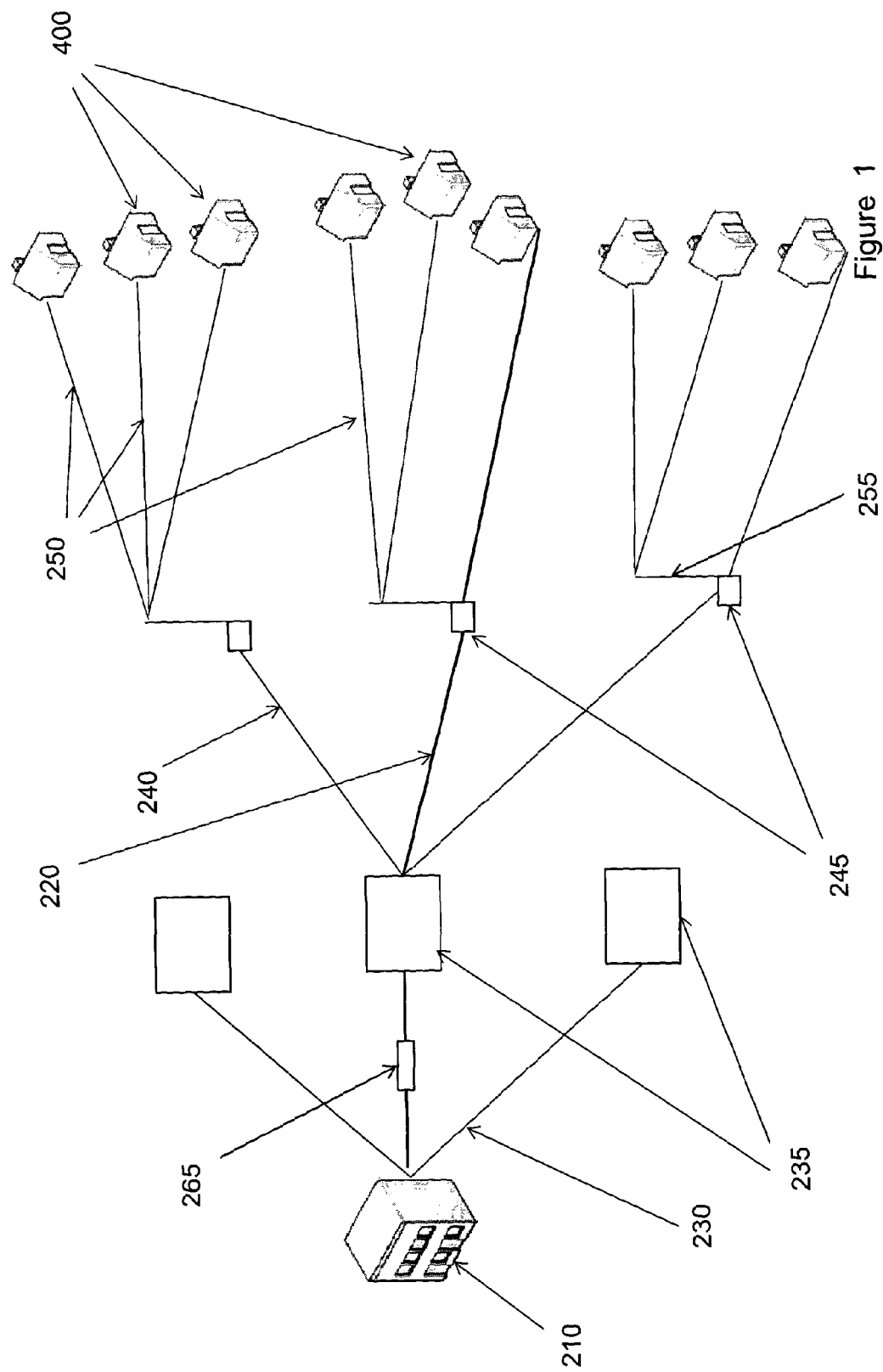
FIG. 1 shows a schematic depiction of a conventional copper access network.
Figure 2:
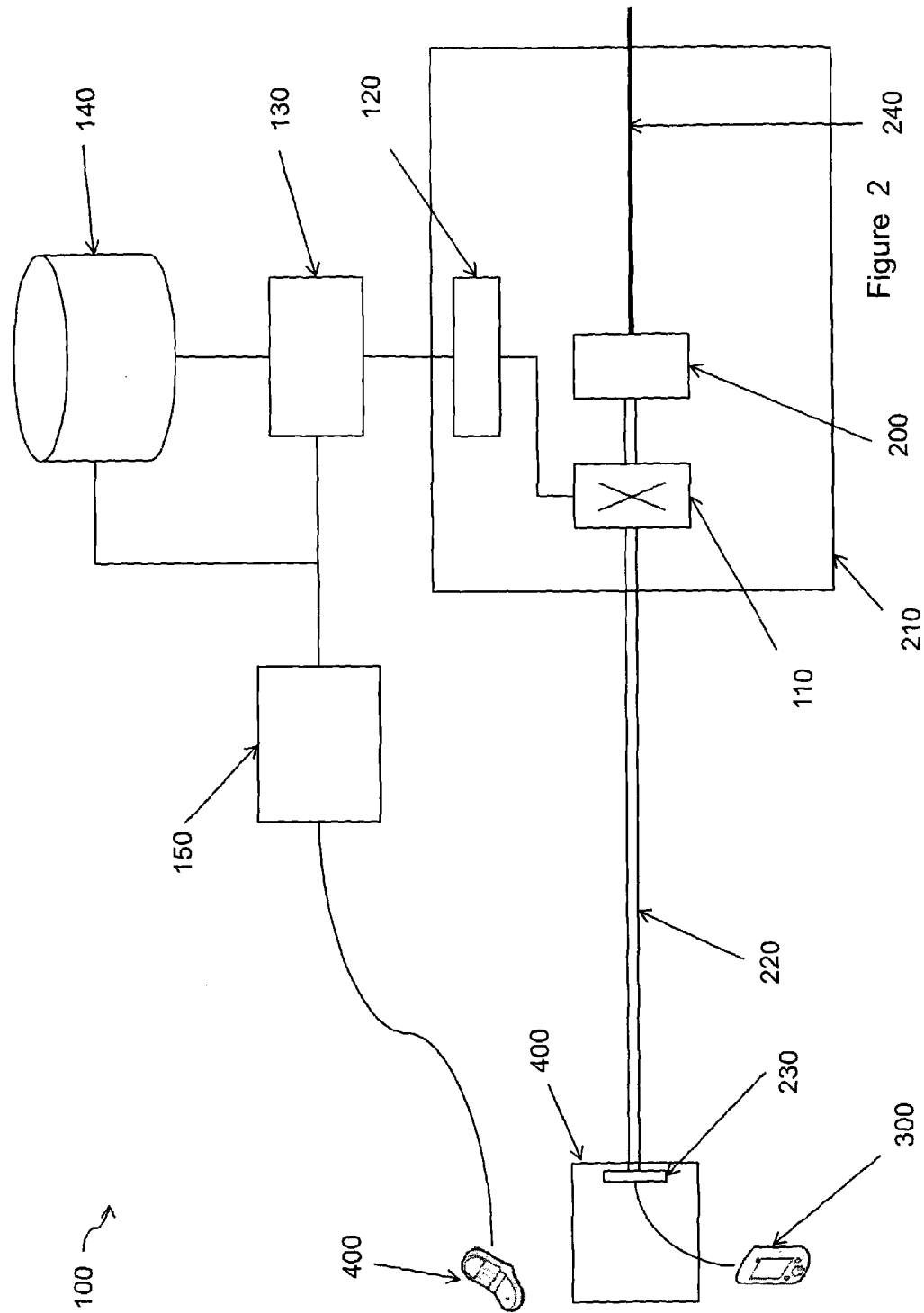
FIG. 2 shows a schematic depiction of a test system 100 according to the present invention.

FIG. 2 shows a schematic depiction of a test system 100 according to an embodiment. The test system comprises a test switch 110, test head 120, test controller 130, test database 140 and communications interface 150. The test system is configured to measure the parameters of a plurality of lines 220 which connect the local exchange 200 to each of a plurality of customer premises 400. For the sake of clarity only one line 220 and one customer premises 400 are shown in FIG. 2. It will be understood that dependent on the size of the exchange and the geographical area served by it, the local exchange may have between several hundred and tens of thousands of different lines. Each line comprises a pair of metallic conductors and at each customer premises the metallic pair is terminated by network termination equipment (NTE) 230. The line will be normally used to support telephony signals and or data signals, for example using digital subscriber line (DSL) technology. At the exchange building 210, the line is connected to the local exchange switch 200 via the test switch 110. The local exchange switch 200 is further connected to a core exchange (or other exchange) via communications cable 240. The test switch 110 is connected to each of the lines connected to the local exchange and is located within the local exchange building 210, in between the local exchange switch and the NTE. The test switch is connected to a test head 120, which is in turn connected to test controller 130. The test controller is connected to a test database 140 and to a communications interface 150. The test database is also connected to the communications interface 150.

When it is required that a particular line 220 be tested, then an engineer will be despatched to the respective customer premises 400 so that test apparatus 300 can be connected to the CPE 230. The engineer can then initiate a test procedure, for example by sending a predetermined message to the test controller using a mobile telephone 400 (for example), via the communications interface 150. The message will include information that allows the test controller to identify the line to be tested such that the test switch can connect that line to the test head. This will cause the line to be disconnected from the local exchange switch but as the test apparatus is connected to the NTE it is unlikely that the line will be in use. The test apparatus is now connected to the test head via the line and thus a series of test signals can be sent over the line in order for the line parameters of interest to be measured.

It will be understood by a skilled person that the exact testing sequence used is not relevant to the teaching of embodiments. An exemplary test sequence may commence with the test head generating a tone signal, for example at a frequency of 1.6 kHz. This tone acts as a signal to the test apparatus to indicate that the test sequence has begun and can also be used to determine the insertion loss in the line at 1.6 kHz. Once the tone has ceased, the test head will connect both the conductors that comprise the line, which are conventionally referred to as A and B wires, to earth and the resistance of the A and B wires is determined. Then, the A and B wires are connected together so that the resistance of the looped wires can be determined. Finally, the loop is disconnected and AC voltage, DC voltage, capacitance and insulation resistance tests are performed for each of the A and B wires. Once the testing is completed an indication may be sent to the test apparatus so that the engineer can remove it from the NTE. Then the test head will be disconnected from the line by the test switch and the line will be re-connected to the local exchange switch.

The parameter data generated during the test will be stored in the test apparatus before it is transmitted to the test database. This may be achieved by connecting the test apparatus to a computer which is connected to an intranet port such that it is in communication with the test database. The test parameter data will be stored along with a range of other data, such as the time and date of the test, identification data for the engineer who performed the test, identification data for the test apparatus that was used to perform the test, etc.

Figure 3:
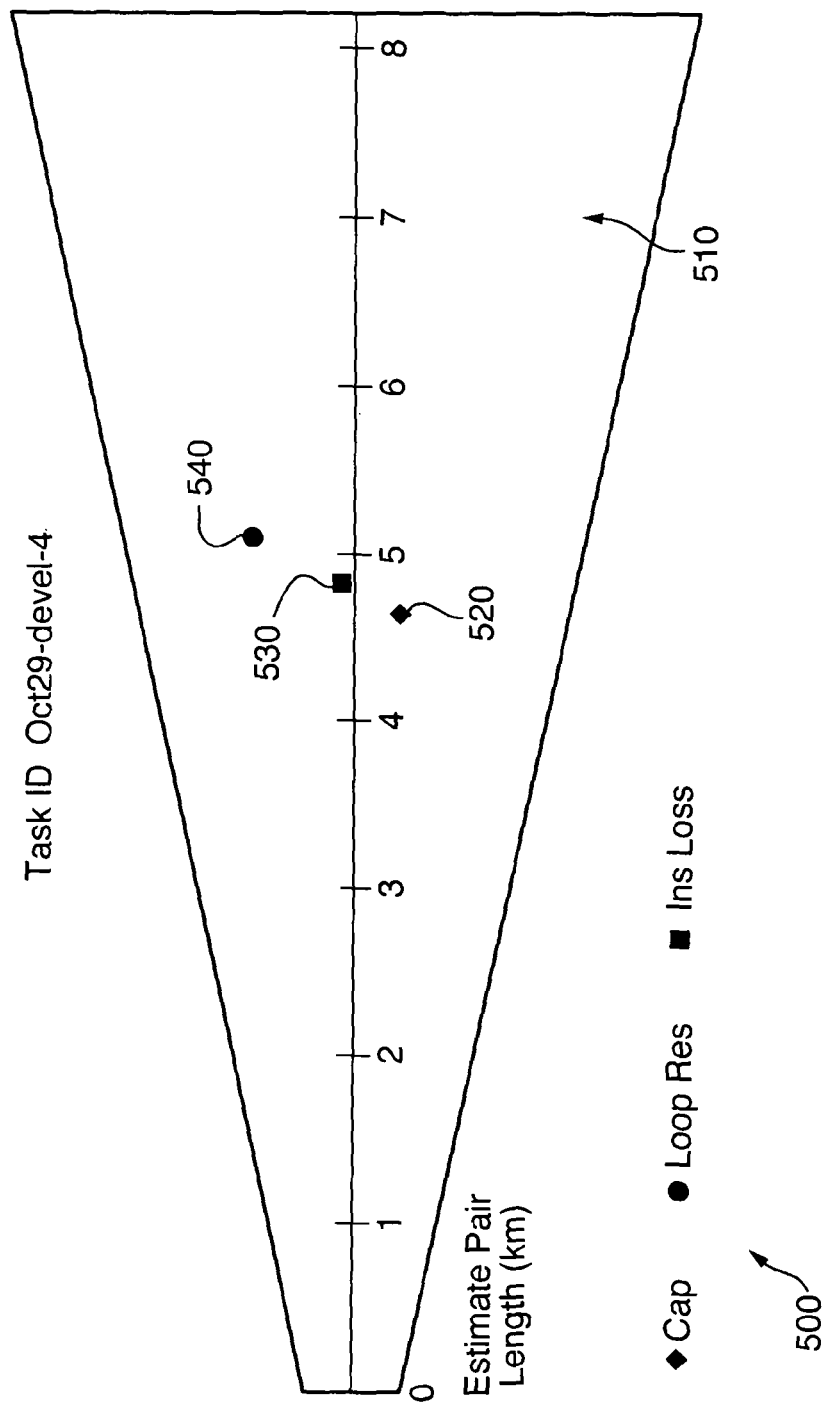
FIG. 3 shows a graphical depiction of a test result showing a cone of acceptability measurement.

The applicant's co-pending European Patent Application No. 10251013.8, which is incorporated herein by reference, discloses a measurement technique in which the quality of a line can be determined from a smaller group of parameters. Some of the measured electrical parameters are, to varying extents, mostly dependent on the length of the line whilst being independent of the other factors and parameters that can affect the electrical characteristics of the line. The parameters which are most dependent on the length of the line are the capacitance value between the A wire and the B wire, the loop resistance and the insertion loss at 1.6 kHz. Using a large database of measurements that have been taken from lines for which their length is known, it is possible to characterize the average electrical parameters of those lines. By measuring a single cable, the length of which is unknown, it is possible to derive an estimation of the cable length from each of the measured parameter values. Furthermore, it is then possible to determine a weighted estimation of the cable length based on these derived values. Expressed formally, the weighted length, $L_W$, is given by $$L_W = \frac{w_C L_C + w_R L_R + w_I L_I}{w_C + w_R + w_I} \quad [1]$$

where $L_C$ is the length derived from the capacitance measurement, $L_R$ is the length derived from the resistance measurement, $L_I$ is the length derived from the insertion loss measurement, $w_C$ is the weighting factor associated with the length derived from the capacitance measurement, $w_R$ is the weighting factor associated with the length derived from the resistance measurement and $w_I$ is the weighting factor associated with the length derived from the insertion loss measurement. It has been found that the length derived from the capacitance measurement, $L_C$, is the value that is least dependent on cable parameters other than the length of the cable and thus this derived value should be given a greater weighting value than the other derived length values, for example $w_C=3$ and $w_R=w_I=1$. Furthermore, it has been observed that an estimation of the quality of a line can be made by comparing the ratios of the lengths derived from the measured cable parameters and the weighted length value. For example, a line may be regarded as having an acceptable performance if all of the ratios of derived length to weighted length are within a first predefined interval. FIG. 3 shows a graphical depiction of how such a test result can be displayed with the graph 500 showing the data points for capacitance 520, insertion loss 530 and loop resistance 540 being shown as being within a cone of acceptability (CoA) 510, indicating that the line is of an acceptable quality.

It will be understood that an operator of a national network will rapidly compile a large test database. The applicant operates a network which has in excess of 30 million lines and the network engineers will perform thousands of tests each day on the network. Since the introduction of the pair quality testing programme (outlined above and described fully in EP10251013.8) in excess of 2,000,000 pair quality test results have been recorded and stored in a database.

If a single test result indicates that a particular line has an unacceptable quality, for example one or more data points may lie outside of the CoA then this may be because:
 (i) there is an unusual build of the line under test;
 (ii) the line is in some way faulty, that is, more formally, the electrical properties of the line are outside of the basic specification; or
 (iii) the tester is not accurately reporting one or more of the length dependent parameters and is therefore operating outside of its specified calibration.

If a series of test results, taken from a number of different lines, show that a particular test apparatus is generating a significant proportion of results that indicate that the lines under test have an unacceptable quality then it is unlikely, by definition, that this is due to a large number of unusual lines being tested. Similarly, it is not very likely that the cause of the test results will be a large number of faulty lines (currently, a fault can be expected on a line in the applicant's access network once every 14 years). Thus, if a test apparatus indicates a significant number of failures (that is, an unacceptable line quality measurement) from a large number of measurements, taken from lines having a large range of pair lengths, then it is likely that the test apparatus is not functioning properly. Thus, if the test database holds a sufficient number of records which relate to a particular test apparatus then that test apparatus can be assumed to be operating within calibrated limits if the proportion of line tests which have a CoA pass is above a predetermined threshold. For example, a test apparatus having 75% CoA passes for 20 or more tests may be considered to be within calibrated limits. Furthermore, a test apparatus having fewer than 75% of the tests leading to a CoA pass for more than 20 tests can be considered as being out of calibration and a formal testing and calibration procedure should be arranged. As the most recent results will be more relevant to the current performance of the test apparatus then more historic test results may be discarded when determining the performance of the meter. For example, as well as considering a minimum number of test results (for example 20) a maximum number may also be considered, for example only the most recent 100 tests may be used. It will be understood that different maximum and minimum values may be used.

It will be understood that the threshold level for the acceptable performance of a test apparatus may vary and may be set at, for example 85% or even higher. An appropriate level may be determined statistically from an analysis of test results and the proportion of test apparatuses that failed to meet the performance threshold which subsequently required re-calibration and/or repairing.

In addition to the three length-dependent parameters discussed above, the determination of whether a line is determined as having an acceptable degree of quality can be based on the measurements of the DC voltage on the line and the insulation resistance. As discussed above, these measurements are made after the line has been disconnected. Thus, any DC voltage measured on the line by the test apparatus is most likely to be caused by the partial degradation of the insulation on the line under test and/or an adjacent line in use (which powered by the line card at a nominal value of 50 Volts DC). The DC voltage and insulation measurements are made between the A and B wires and between both the A wire and earth and the B wire and earth. The measured parameter values are recorded as described above. The results from approximately 2 million test measurements indicate that the approximately 96% of DC voltage results are within the range of ±2V and 95% of insulation resistance measurements are at least 1 MΩ. Accordingly, if the values of these parameters do not reach a predetermined threshold then it can be concluded that the line under test does not reach acceptable quality levels. For example the line may be deemed to fail if the measured DC voltage is outside the range of ±4V or if the insulation resistance value is less than 0.5 MΩ. It should be understood that other parameter values may be used.

These parameters may be used as an alternative to, or as an extension to, the testing based on the three length-dependent parameters discussed above. For example, if the test results for a particular test apparatus show that, for example, less than 75% of lines tested have DC voltage and insulation resistance measurements that meet the normal ranges and distributions measured over a minimum of 20 individual Pair Quality tests then the test apparatus may be deemed to not be operating correctly. Accordingly, it may then be taken out of service and be re-calibrated and/or be repaired and then re-calibrated.

Figure 4:
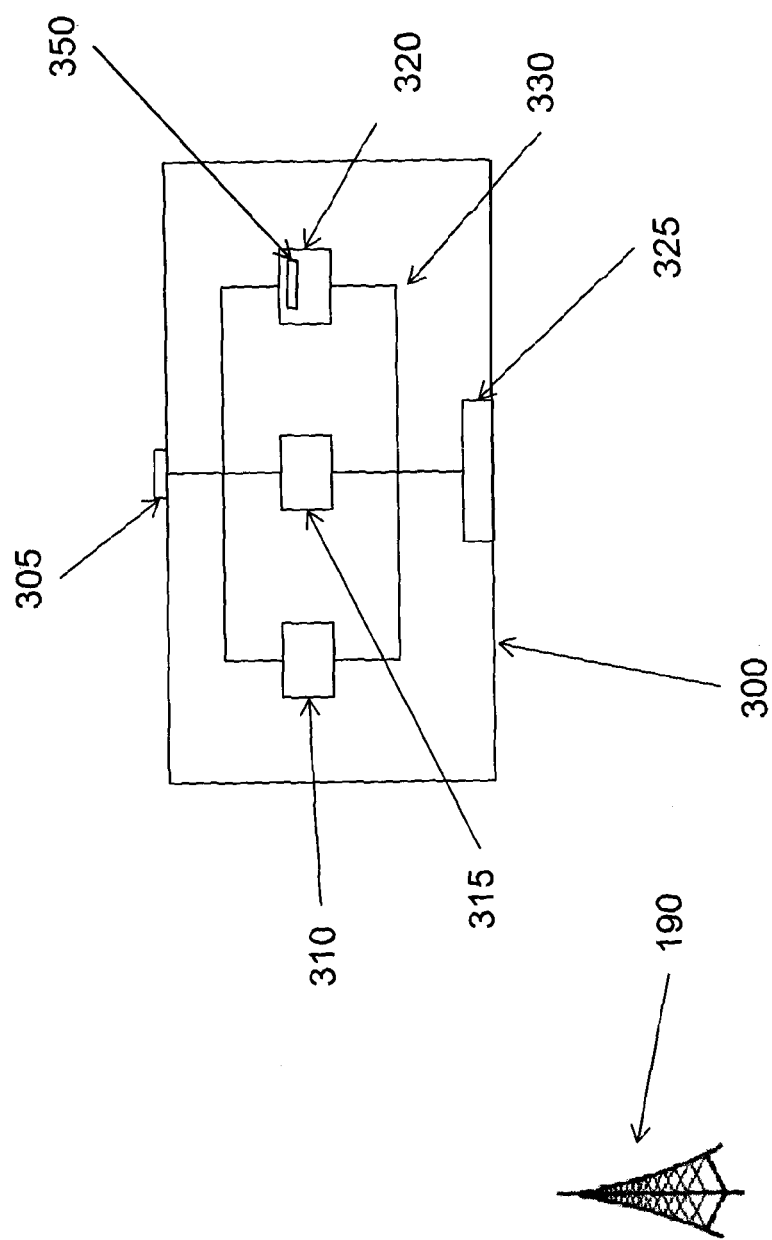
FIG. 4 shows a schematic depiction of test apparatus 300 according to the present invention.

FIG. 4 shows a schematic depiction of test apparatus 300 according to an embodiment. The test apparatus 300 comprises test interface leads 305, processing unit 310, memory means 315 and data storage means 320. The network testing equipment further comprises a communications interface 325 and a data bus 330 which interconnects the interface 325 with the test interface leads 305, processing unit 310, memory means 315 and the data storage means 320. The test interface leads 305 can be connected to a line at either a primary node, a secondary node, a cable joint or at any other network location where the pair of copper wires that constitute the line are accessible. The test interface leads 305 can be connected to the line and the processing unit 310 causes appropriate test signals to be generated and applied to the line under test. The response of the line to the test signals can be measured and the parameters of interest determined.

For example, if using the method of EP10251013.8, then based on the pre-determined average parameter values per kilometer length, the processing means can determine the derived length for each of the parameters of interest and then the weighted average length. Once the weighted average length has been calculated then it is possible to determine the condition of the line, for example by computing the ratios of the derived length to the weighted average length for each of the parameters of interest or by computing a cone analysis. The measured responses and all calculated data can be stored within the data storage means 320.

Software 350 to interpret the line measurements, calculate the parameters of interest and then compute any analysis of the parameters is also stored within the data storage means 320. In operation this software will be copied into the memory means and then executed by the processing unit in order to implement a method according to an embodiment. The communications interface 325 may be, for example, a cellular data modem such that the portable network test apparatus 300 can transmit data to the test system 100 via a wireless network 190, for example via communications interface 150. If the test apparatus comprises such functionality then the test apparatus may be used to initiate the test procedure by sending a predetermined message to the test controller. Alternatively, or in addition, the network interface may allow the portable network test apparatus to be connected to a fixed network port such that data can be exchanged between the portable network test apparatus and the OSS. For example, it may be possible to connect the test apparatus to a personal computer which is connected to a corporate intranet, for example via a USB connection, so that all of the test data held on the test apparatus can be communicated to the test database 140.

It will be understood that the test system described above will comprise one of a number of operational support systems (OSSs) which are required to operate an advanced communications network. The test apparatus may also receive instructions from the test system for the engineer operating the test apparatus, for example detailing subsequent cables to be tested and/or other jobs which have been scheduled to be performed by the engineer.

The initiation of the test sequence may involve placing a telephone to a call center with human operatives or to an interactive voice response system. Alternatively, the engineer may send a text message or an email to a dedicated address. It will be understood that the information sent to the communications interface 150 must comprise sufficient data to allow the line to be tested to be identified, along with additional data concerning the engineer performing the testing and the test to be carried out.

It will be understood that such an apparatus may perform the method according to embodiments on its own or in addition to other testing, fault identification or fault location techniques, such as those disclosed in the applicant's earlier patent applications, for example, WO04/086738, WO01/76209 or WO01/76208, which are incorporated herein by reference. Furthermore, the apparatus may comprise additional test modules that enable it to test for other parameters which relate to the state of the copper pairs which comprise the transmission line, or to send and analyse data signals such that the ability of the transmission line to carry data services, such as DSL, for example.

A portable network test apparatus according to the present invention may be a standalone unit. For example, test apparatus such as the EXFO AXS-200 or the JDSU HST-3000C may be modified by the provision of additional software in order to be able to implement the present invention. Alternatively, it may be a suitably adapted laptop computer, such as a Panasonic™ Toughbook™, a tablet computer such as an Apple iPad or a smartphone with additional software and hardware to enable the functionality of the test apparatus to be implemented. In such a case, the data storage means will additionally store operating system software, one or more further applications and data which has been generated by, or is used by, the computer. Computer software suitable for implementing a method according to the present invention may be provided by a download, for example via the internet, or on some physical media, for example, DVD, CD-ROM, USB memory stick, etc.

In summary, the performance of a test apparatus for a communications network may be inferred by analysing a set of performance data results measured on a number of different lines in the network. Once a sample of sufficient size for a particular test apparatus has been created then it is possible to infer the performance of the test apparatus based on the ratio of passes to fails recorded.

The invention claimed is:

1. A method of determining the performance of a test apparatus, the method comprising:
   a) attaching a test apparatus to a communications network, the communications network comprising a plurality of local exchanges, each of the local exchanges being connected to a plurality of customer premises by a metallic loop;
   b) applying one or more test signals to a metallic loop;
   c) determining one or more metallic loop parameters in accordance with measurements made whilst the one or more test signals were applied to the metallic loop, wherein the one or more metallic loop parameters comprise an insertion loss, a resistance of the metallic loop, and a capacitance between two wires that comprise the metallic loop;
   d) comparing the one or more metallic loop parameters to predetermined threshold values;
   e) determining a status of the metallic loop on the basis of the comparison performed in d) by:
      (i) determining an estimate for a length of the metallic loop for each of the one or more metallic loop parameters based on the measured parameter value and a pre-determined further value associated with each of the one or more metallic loop parameters,
      (ii) determining a weighted average metallic loop length based on the plurality of metallic loop length estimates, and
      (iii) inferring a condition of the metallic loop based on the weighted average determined in (ii) and the plurality of metallic loop length estimates determined in (i) by determining a ratio of the estimated metallic loop length to the weighted average metallic loop length for each of the plurality of metallic loop parameters;
   f) storing data relating to the status of the metallic loop in a database; and
   g) determining the performance of the test apparatus on the basis of the data stored in the database which relates to tests carried out by that test apparatus.

2. A method according to claim 1, wherein the performance of the test apparatus is determined to be acceptable if a ratio of acceptable test results to unacceptable test results is greater than a predetermined threshold value.

3. A method according to claim 2, wherein the ratio of acceptable test results to unacceptable test results is determined based on a pre-determined number of measurements.

4. A method according to claim 2, wherein the performance of the test apparatus is determined to be acceptable if the ratio of acceptable test results to unacceptable test results is greater than 75% and this ratio has been calculated from at least 20 measurements.

5. A method according to claim 1, wherein in (iii), the condition of the metallic loop can be inferred as being acceptable if each of the plurality of ratios is less than a first predetermined value.

6. A method according to claim 1, wherein it can be inferred that the metallic loop may have an unacceptable condition in the future if each of the plurality of ratios determined in (iii) is greater than the first predetermined value but less than a second predetermined value.

7. A method according to claim 1, wherein in (iii), it can be inferred that the metallic loop has an unacceptable condition if each of the plurality of ratios determined in (iii) is greater than the second predetermined value.

8. A test apparatus comprising a processing unit, memory means and data storage means, the apparatus being configured, in use, to perform a method according to claim 1.

9. A test apparatus according to claim 8, wherein the apparatus comprises a portable network testing apparatus.

* * * * *